United States Patent [19]
Pink

[11] 3,781,934
[45] Jan. 1, 1974

[54] DOCKBOARD
[75] Inventor: David A. Pink, Cadillac, Mich.
[73] Assignee: Brooks & Perkins, Incorporated, Southfield, Mich.
[22] Filed: Sept. 22, 1972
[21] Appl. No.: 291,229

[52] U.S. Cl. .................................................. 14/72
[51] Int. Cl. ............................................ E01d 15/12
[58] Field of Search ................................. 14/72, 71

[56] References Cited
UNITED STATES PATENTS
2,452,222  10/1948  Bryson ..................................... 14/72
2,419,870  12/1949  McLaughlin .............................. 14/72
2,521,349  9/1950  Diamond .................................. 14/72
3,184,773  5/1965  Breneman ................................ 14/72
3,480,980  12/1969  Yoon ....................................... 14/72

Primary Examiner—Nile C. Byers, Jr.
Attorney—Donald P. Bush

[57] ABSTRACT

A dockboard having a combined stop bracket and handle attached to the underside thereof, said bracket being of L-shape and having one leg attached to the dockboard, the handle being generally U-shaped and having the free ends of its legs attached, preferably by continuous welding, to the leg of the bracket which is attached to the dockboard.

10 Claims, 4 Drawing Figures

PATENTED JAN 1 1974 3,781,934

3,781,934

DOCKBOARD

BRIEF SUMMARY OF THE INVENTION

The present invention relates to a combined stop bracket and handle for use with a dockboard, and the combination of the dockboard with such combined bracket and handle.

Dockboards generally are flat plate-like structures adapted to be positioned to extend across a space between working surfaces, such for example as the bed of a truck and a loading dock. In order to prevent lateral movement and possible disengagement of the dockboard from one of the surfaces, there are provided at the underside of the dockboard a plurality of stop brackets. These stop brackets are generally of L-shape, having angularly related legs one of which is attached by bolts, screws or the like, to the underside of the dockboard adjacent the edges thereof and spaced from the ends of the dockboard to permit substantial engagement with the end portion of the dockboard with the associated working surface.

In order to provide for convenient manipulation of the dockboard, the brackets are provided with handles having generally a U-shape providing laterally spaced legs interconnected at one end by a connecting portion. The free ends of the legs of the handle are permanently affixed to the bracket. Preferably, the connection between the handle and bracket is provided by positioning one leg of the handle to extend across the free end of one leg of the bracket while the other leg of the handle extends across the bracket at the outside of the angular juncture between its legs. The connection between the overlapped leg portions of the handle and the bracket is provided by continuous welds.

The length of the legs of the handle are selected such as to provide a lateral extension of the closed end of the U-shaped handle structure sufficient to provide a convenient handle grip thereof, by means of which the dockboard may be manually transported.

DETAILED DESCRIPTION

Figure 1:
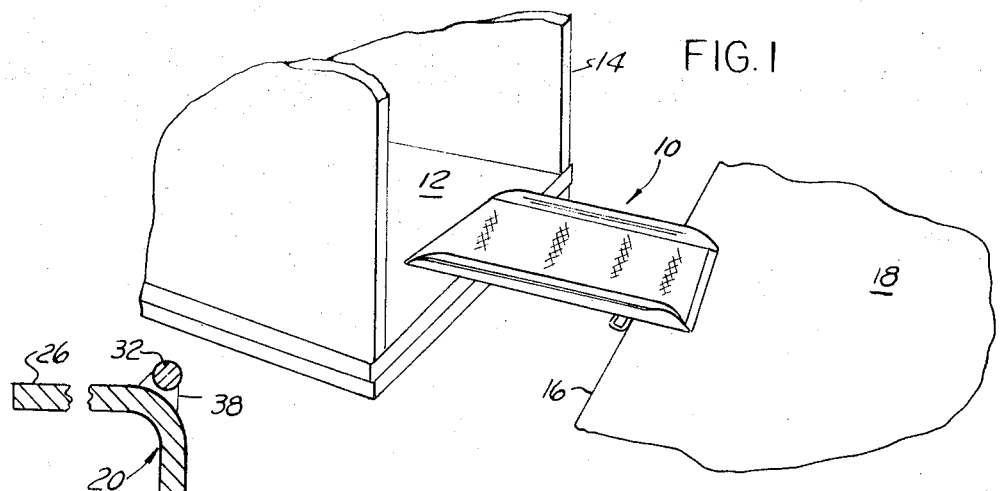
FIG. 1 is a fragmentary perspective view showing a dockboard extending across the space between a loading dock and a bed of a truck.

Referring first to FIG. 1, a dockboard indicated generally at 10 is provided to span the space between the floor 12 of a truck 14 and the edge 16 of a loading dock, the upper surface of which is indicated at 18. In order to prevent movement of the dockboard 10 as wheeled vehicles are rolled over it, the dockboard is provided with a plurality of stop brackets 20, the stop brackets being generally of L-shape and having one leg 22 adapted to be secured to the underside of the dockboard by suitable means such as bolts, screws, or rivets indicated diagrammatically at 24. Each bracket 20 includes a second abutment leg 26 which is adapted in use to abut an edge surface such as 16 of the loading dock or the corresponding surface of a truck, or at least to come into engagement with such edge in order to prevent movement of the dockboard which would cause an end thereof to become disengaged from the working surface.

In order to provide for convenient transportation and maneuverability of the dockboards by manual means, the stop brackets 20 are provided with handles indicated generally at 30. The handles 30 are conveniently formed of round bar stock bent into generally U-shaped configuration and thus, providing laterally spaced legs 32 adapted to be attached to the stop brackets and a looped handle portion indicated generally at 34 which in assembly extends laterally beyond an edge of the dockboard.

Figure 3:
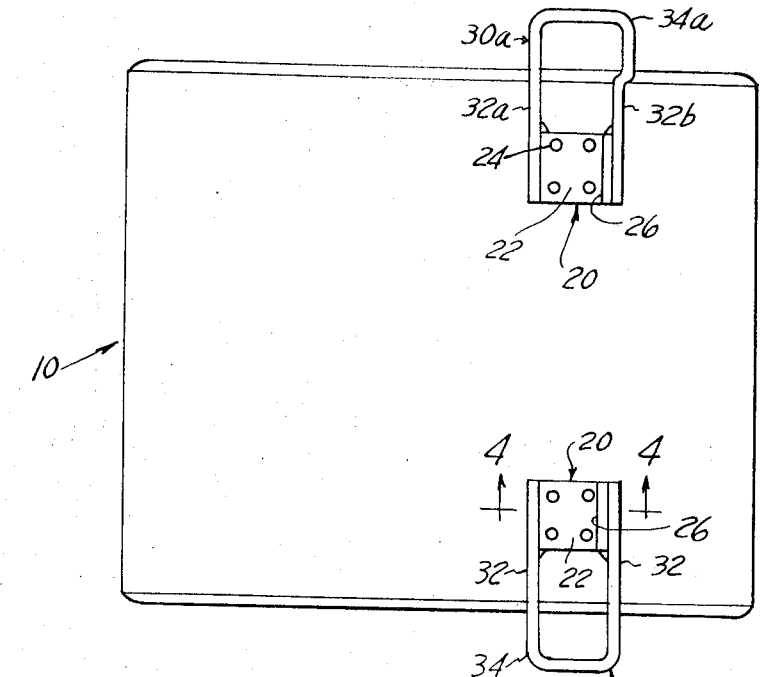
FIG. 3 is a bottom plan view of the dockboard.

In FIG. 3 the handle 30 is illustrated as being of a U-shaped configuration in which both of the legs 32 are straight throughout. At the upper side of the dockboard 10 the bracket is designated generally at 30a and is identical with the bracket 30 except that the leg portions, here designated 32a and 32b, are slightly modified. The outer end portions of the legs of the handle adjacent the free ends thereof are spaced apart a distance to conform to the appropriate dimension of the leg 22 of the stop bracket 20. The inner portions of the legs, as illustrated at 32a and 32b, are spaced apart a somewhat greater distance to increase the lateral dimension of the handle portion here designated 34a.

It will of course be understood that if the dimensions of the leg 22 of the stop bracket are appropriate, the legs 32 of the handle may be as illustrated at the lower portion of FIG. 3. On the other hand, if the leg 22 of the stop bracket is somewhat narrower it may be desirable to widen the handle portion as indicated at the upper side of the dockboard shown in FIG. 3. It will of course be understood that normally both handles on the dockboard will be as shown at 30 or at 30a.

Figure 4:
FIG. 4 is an enlarged view through the combined stop bracket and handle, on the line 4—4, FIG. 3.
Figure 2:
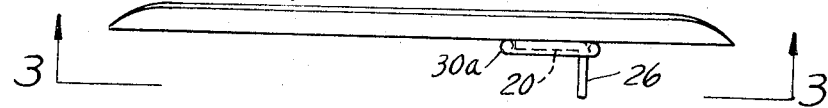
FIG. 2 is a side elevation of the dockboard provided with the combined bracket and handle structure of the present invention.

Referring now to FIG. 4, it will be observed that one of the leg portions 32 of the handle is welded as indicated at 36 along the free edge of the leg 22 of the stop bracket 20. The outer end of the other leg 32 of the handle is welded as indicated at 38 to the outer surface of the bracket 20 at the junction between its legs 22 and 26. It will also be observed that the handle 30 is welded to the bracket 20 in such a position that when the leg 22 of the bracket is tightly assembled against the under-surface of the dockboard, the handle will be spaced very slightly below the plane of the under-surface of the dockboard.

It will be observed that the handle is attached directly to the bracket by a permanent attachment such as welding, whereas the combination of the bracket and handle is removably attached to the dockboard as by threaded fasteners, rivets or the like. This permits removal of the stop bracket from the dockboard for attachment thereto of a handle or repair of a handle as required.

What I claim as my invention is:

1. An L-shaped stop bracket for attachment to the underside of a dockboard adjacent an edge thereof, said bracket having one leg thereof adapted to be secured with its outer surface in contact with the under-surface of said dockboard, and a generally U-shaped handle secured to said bracket, said handle having laterally spaced leg portions, the outer end portion of one of the leg portions of the handle being permanently affixed to the end of the leg of the bracket adapted to be secured to the dockboard and the outer end portion of the other leg portion of said handle being affixed to the outer surface of said bracket at the junction of its legs, the length of said handle being such as to extend beyond one side of said bracket sufficiently to provide a looped handle portion for convenient gripping by hand.

2. Structure as defined in claim 1 in which the free ends of the legs of said handle extend axross the width of said bracket substantially to an edge thereof.

3. Structure as defined in claim 2 in which the end portions of the legs of said handle are welded to the free edge of one leg of said bracket and to the outer surface of said bracket at the junction of its legs.

4. Structure as defined in claim 3 in which said handle is positioned with respect to said bracket so as to be slightly spaced inwardly from the outer surface of the leg of the bracket to which it is welded.

5. Structure as defined in claim 1 in which said handle has the inner leg portions thereof spaced apart somewhat further than the outer leg portions at the free ends of said legs to provide an enlarged portion for gripping hand engagement.

6. A dockboard comprising an essentially flat plate adapted to span a space between the edges of working surfaces, stop brackets at the underside of said board, said brackets being provided in pairs adjacent the lateral edges of said board, each of said brackets being L-shaped having one leg secured to the underside of said board and the other leg extending from said board to engage an edge of one of the working surfaces to prevent slipping of the dockboard, a generally U-shaped handle secured to said each of said brackets, said handle having laterally spaced leg portions, the outer end portion of one of the leg portions of said handle being permanently affixed to the end of the leg of the bracket which is secured to said dockboard, the outer portion of the other leg of said handle being permanently affixed to the outer surface of the bracket at the junction of its legs, the lengths of the legs of said handle being such as to extend beyond the adjacent edge of said dockboard and to provide a looped handle portion for convenient gripping by hand.

7. A dockboard as defined in claim 6 in which the free end portions of the legs of said handles extend across the width of said brackets substantially to the edges thereof remote from the adjacent edges of said dockboard.

8. A dockboard as defined in claim 7 in which the legs of said handles are affixed by welding to said brackets.

9. A dockboard as defined in claim 8 in which the handles are spaced slightly from the undersurface of said dockboard, and the legs of said brackets attached to said dockboard are in firm surface contact therewith.

10. A dockboard as defined in claim 6 in which said handles have the inner leg portions thereof spaced apart somewhat further than the outer leg portions at the free ends of said legs to provide an enlarged portion for gripping hand engagement.

* * * * *